March 4, 1930.  E. P. BULLARD, JR  1,749,374
MACHINE TOOL
Filed Aug. 26, 1927  4 Sheets-Sheet 1

INVENTOR.
Edward P. Bullard Jr.
BY
Chamberlain & Newman
ATTORNEYS.

March 4, 1930.  E. P. BULLARD, JR  1,749,374
MACHINE TOOL
Filed Aug. 26, 1927   4 Sheets-Sheet 2

INVENTOR.
Edward P. Bullard Jr
BY
Chamberlain & Newman
ATTORNEYS.

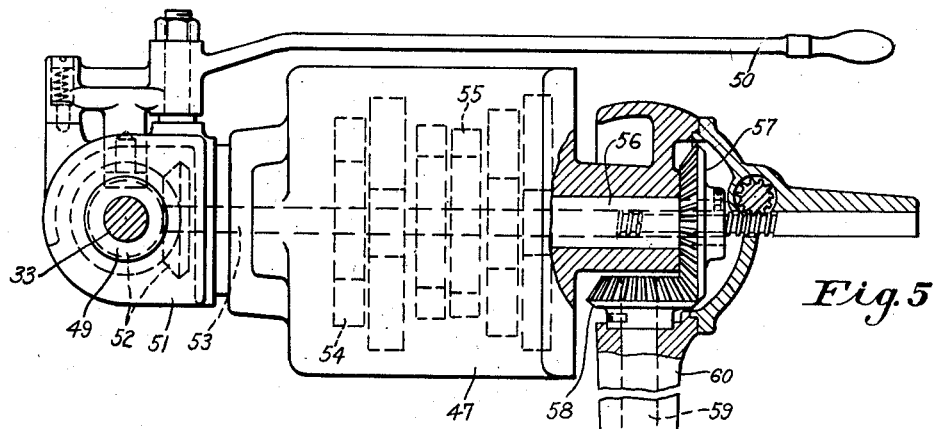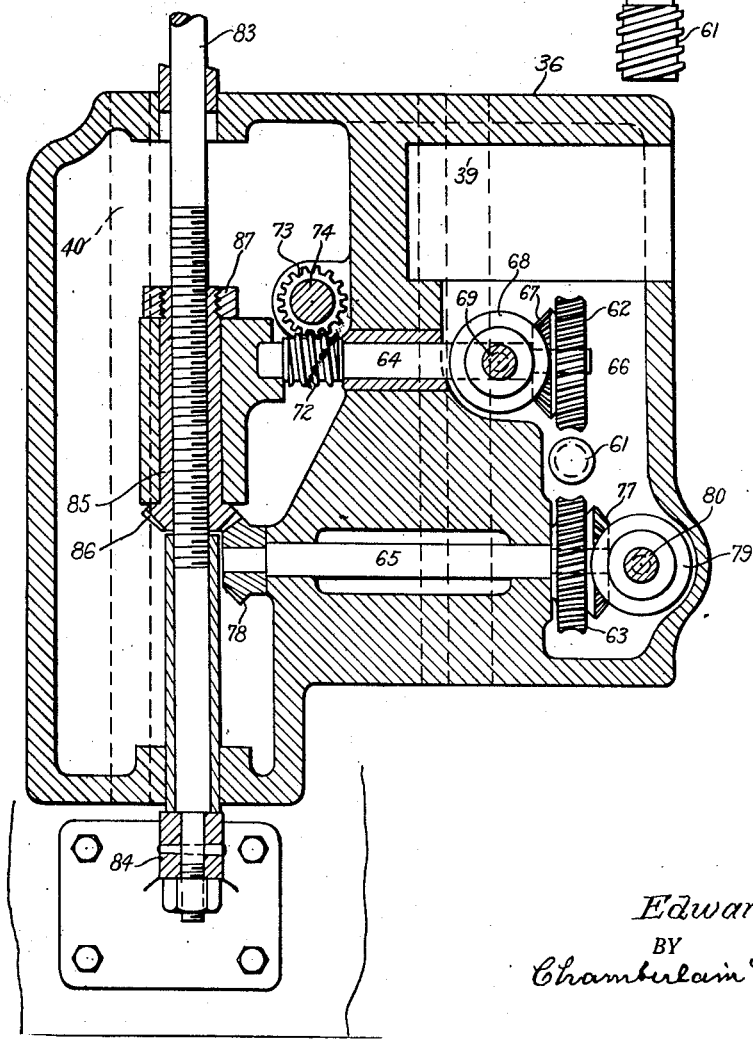

Patented Mar. 4, 1930

1,749,374

UNITED STATES PATENT OFFICE

EDWARD P. BULLARD, JR., OF STRATFORD, CONNECTICUT, ASSIGNOR TO THE BULLARD COMPANY, OF BRIDGEPORT, CONNECTICUT, A CORPORATION OF CONNECTICUT

MACHINE TOOL

Application filed August 26, 1927. Serial No. 215,600.

This invention relates to new and useful improvements in machine tools of the lathe and boring mill types such as include a rotatable work carrying table mounted to operate on a vertical axis, and having front and side tool carrying heads for operating upon work carried by the rotary table.

The invention is applicable to a commercial type of machine having a rotary work carrying table and in conjunction with which is employed a vertically adjustable cross rail carrying one or more front centrally arranged turret heads that are laterally movable upon the cross rail and adapted for both horizontal and vertical feeding movements.

The invention more particularly relates to a novel form of side head and mechanism for operating the same, which is designed and especially adapted for the above type of machine and whereby tools of the side head may be fed to the work upon the rotary table in conjunction with and in close proximity to the vertical and horizontal moving tools of the front turret heads.

A further and important object of the invention is to provide a saddle for a side head which is compact and rigid and form a firm support for the tool head carried thereby.

It is also to be noted that the side head is hung directly on vertical ways or uprights of the front corner portion of the bed of the machine, thereby forming but one vertical slide joint between turret and bed which obviously insures accuracy for angular type of slide. The slide is thus brought nearer to the bed, the overhang of slide being less than heretofore, thus insuring a compact and more rigid combination. The slide is further mounted to operate radially with respect to the work table and center of work carried thereon.

The design in its entirety is relatively simple in construction and is none the less rigid and durable. The saddle is carried in front of, and in side of ways of bed, being slidably fitted to ways thereof and has flat bearing surface on corner of bed to further support the saddle.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawing forming a part of this specification and upon which Fig. 1 shows an incomplete front view of a commerical type of lathe, to which my invention is shown applied;

Fig. 4 is an enlarged vertical sectional view taken on line 4—4 of Fig. 3; and

Fig. 5 is an enlarged sectional plan view to be read in connection with the same parts, shown in Fig. 3.

Figure 1:
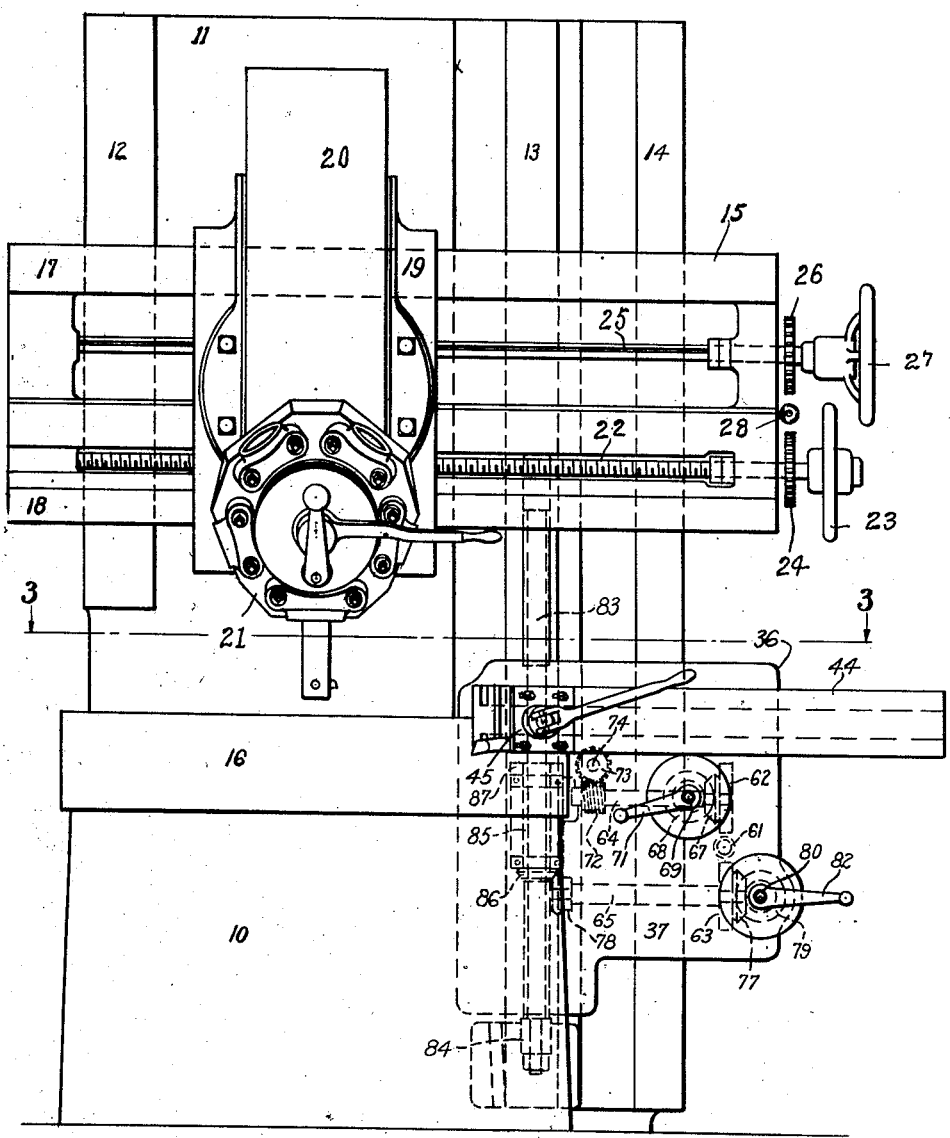

Referring in detail to the characters of reference marked upon the drawing, 10 represents the base of the machine and 11 an upright which may be formed integral with or secured to the rear of the base. This upright includes vertical ways 12, 13 and 14 on its front face and upon which a vertically adjustable cross rail 15 is mounted. This cross rail is provided with power means, not shown, for moving it vertically upon the ways above mentioned. 16 represents a rotatable work carrying table; this is mounted in the base and provided with operating means, not shown, whereby the table, and work carried thereon may be rotated at various speeds, while the cutting tools carried by the turret and side head are being fed to the work.

The cross rail 15 includes an upper and lower finished face 17 and 18 forming ways upon which a saddle 19 is slidably mounted for supporting a slide 20 that carries a tool carrying turret 21. This saddle is engaged by a longitudinal screw 22 journaled in the end portions of the rail and provided with a wheel 23 for hand operations and a worm gear 24 through which it is power driven for feeding the saddle and turret crosswise on the rail.

A feed shaft 25 is also journaled in the end portions of the cross rail 15 and is connected to operate the slide 20 upon which the turret head 21 is mounted, by mechanism not herein shown. The outer end of this feed shaft 25 like the screw 22, is provided with a worm gear 26 which is positioned above said worm gear 24 and in spaced relation thereto. By means of the hand wheel 23 of the screw 22 and a hand wheel 27 provided on the feed shaft 25 the saddle 19 and turret head 21 may be manually operated.

These worm gears 24 and 26 may be operated independently by a worm 28 carried upon a short shaft 29 journaled in a swinging arm 30 that is normally positioned to hold the worm in a disengaged neutral position between the two said worm gears. This arm is flexibly supported and adapted to be swung up or down to bring its worm into mesh with either of the before mentioned worm gears 24 and 26 for operating the turret.

Figure 2:
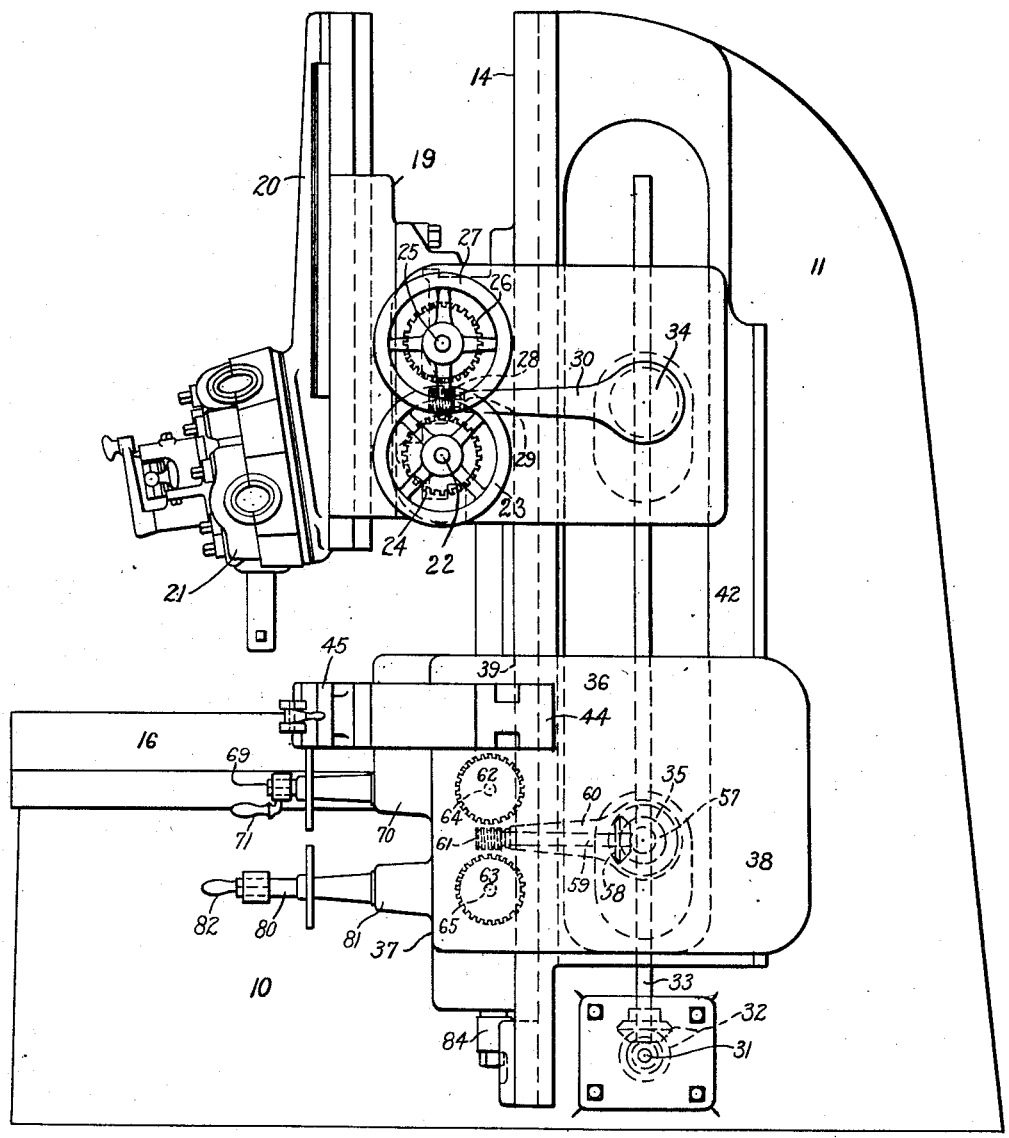
Fig. 2 is a side view as seen from the right of Fig. 1.

31 represents a horizontal driving shaft that is connected by bevel gears 32 with a vertical feed shaft 33 for driving the feeding mechanism of both the front and side head. This shaft is connected as at 34 to drive the short shaft 29 before mentioned, for operating the front head 21. A somewhat similar driving connection 35, see Figs. 2 and 4, is employed for operating the side head as will be explained.

The turret head 21 may be of the usual or any preferred form though like its saddle 19, cross rail and operating mechanism, is shown to be of a standard design, such as is employed on our vertical turret lathes.

36 represents a side head saddle which as seen from the top is of a general L-shape, and mounted upon the front right hand corner portion of the upright 11 and is adapted to be moved vertically thereon through power connections later to be referred to.

37 represents the front portion of the side head saddle and 38 the rearwardly extending side portion. The vertical face 39 of the inner front corner portion of the saddle is finished to engage and operate upon the way 14, while the face 40 similarly engages and slides upon the face of the way 13. In addition to these two engaging surfaces, I also provide a face 41 upon the inner side of the side of the side portion 38 of the saddle 37 to engage the vertical way 42 upon the side of the upright 11. The two last mentioned slide ways 13 and 14 of the saddle are provided with gibbed overhanging projections 43 for the engagement and support of the saddle upon the ways. This saddle and slide carried thereby, like the cross rail, saddle and turret mounted above, are operated through the vertical shaft 33 and the driving shaft 31, and may be operated simultaneously or independently as desired. The feed for slide 44 and its side head 45 is through a change speed gearing 46 enclosed within a housing 47 and is derived from the before mentioned shaft 33. This housing is secured to the side head saddle 37 by screw bolts 48 and together with the connected parts, is designed to be carried up and down therewith.

Figure 3:
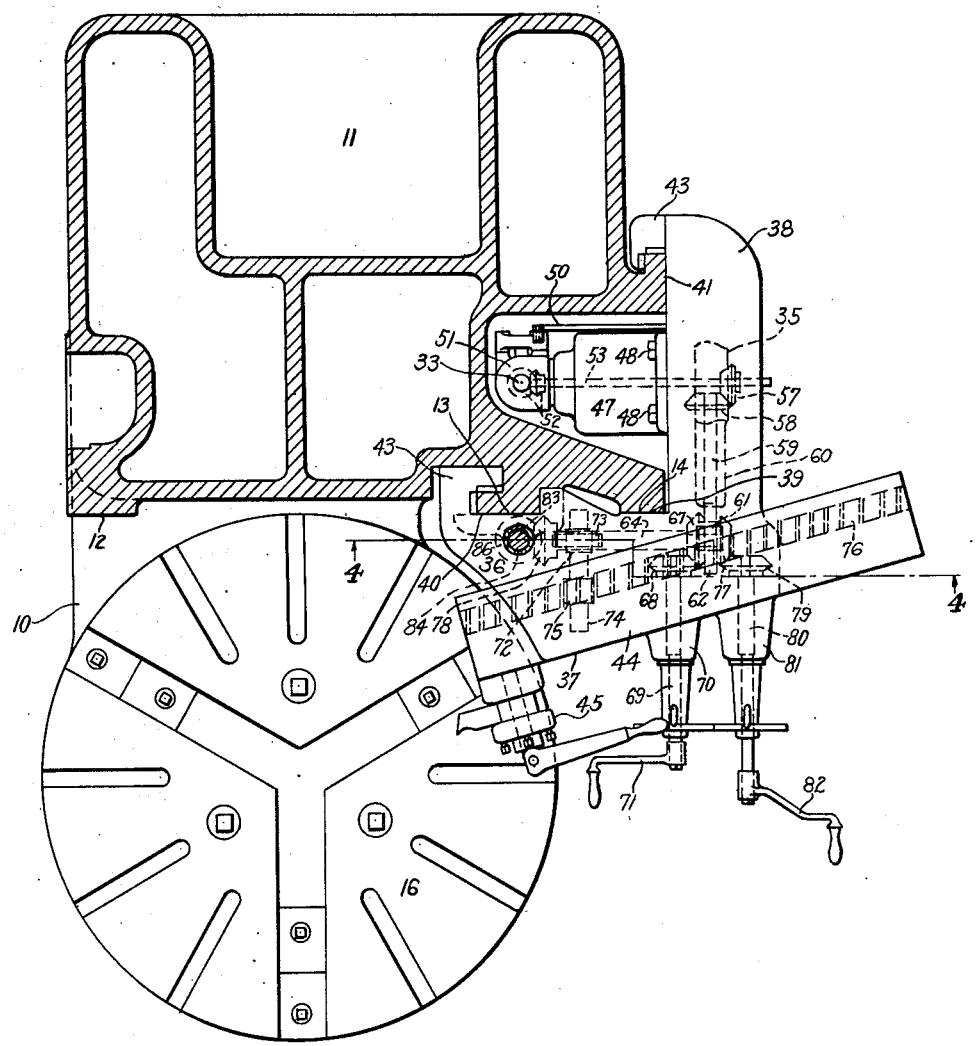
Fig. 3 is a sectional plan view taken on line 3—3 of Fig. 1.

Referring to Figs. 3 and 5, it will be seen that a slidable sleeve and clutch connection 49 is made with the said shaft 33, said clutch being operated through a lever 50 secured to a housing 51 for enclosing the said clutch sleeve and bevelled pinions 52, one of the bevelled pinions being connected with the clutch member and the other with a shaft 53 upon which a train of gears 54 is carried. The gears of this shaft 53 are adapted to be connected for operating a second train of gears 55 on a driven shaft 56 all of which gears and shafts are contained within the housing 47 heretofore mentioned. A bevelled gear 57 is secured upon the last mentioned shaft 56 and meshes with and drives a smaller bevelled gear 58 carried upon a worm shaft 59 and journaled within an arm 60.

This arm 60 is adapted to swing vertically upon and with respect to the shaft 59, so that the worm 61 carried upon the shaft 59, may be raised and lowered and thereby brought into engagement and disengagement with the worm gears 62 and 63 secured upon the short shafts 64 and 65 respectively and journaled within the front portion of the side head saddle. This shaft 59 like the before mentioned shaft 29, is adapted to not only be engaged with one or the other worm gears 62 or 63 but may also be adjusted to occupy a disengaged intermediate position as shown in Fig. 4 and whereby no feeding movements are imparted to the side head or its saddle.

The driving connection thus afforded through worm gear 62 obviously serves to feed the slide and its tool head while the second operating connection, through the worm gear 63 is for the purpose of feeding the saddle and parts carried thereby vertically.

The side head saddle 36 has both its front and side portion cored out in places to lighten the casting and form pockets to receive the shafts, gears, worms and other operating mechanisms and in this connection it will be observed that the bevel gears 57 and 58 together with the shaft 59 and arm 60, are positioned within one of these pockets, designated as 66 in the side portion of the saddle and is thus enclosed.

A bevelled gear 67 is secured upon the short shaft 64 adjacent to the worm gear 62 and meshes with a similar bevelled gear 68 upon a shaft 69 journaled in bearings 70 of the saddle. An operating handle 71 is secured to the outer end of this shaft 69 for rotating the same and its bevel pinion for hand operations of the short shaft 64 and the tool slide.

This operative connection for the tool slide comprises a worm 72 upon the short shaft 64 that meshes with and drives a worm gear 73 upon a short shaft 74 journaled in bearings of the saddle. This short shaft 74 also carries a pinion 75 that engages a longitudinal rack 76 on the under side of the slide 44 and whereby the latter is moved backward and forward within the guideway 77 formed in the saddle and whereby the tools carried by its head 45 are fed to the work on the rotary work table.

The short shaft 65 carries a bevel gear 77 upon one end and a similar gear 78 upon the other end. The first mentioned gear 77 meshes with a bevel gear 79 upon a shaft 80 journaled in a bearing 81 of the saddle, and is provided with a handle 82 for manual operations.

One end of a threaded rod 83 is secured to a bracket 84 attached to the base of the machine and extends up through the side head saddle. An internally threaded sleeve 85 is mounted on this threaded rod 83 and is journaled in a portion of the side head saddle. The sleeve is provided with a bevel pinion 86 upon one end to mesh with the before mentioned pinion 78 and is provided with a collar 87 upon its upper end portion to hold the sleeve against endwise movement and to insure vertical raising and lowering movements of the saddle with the turning of the threaded sleeve 85 upon its threaded portion of the rod 83. From the foregoing it will be seen that when the driving worm 61 is in mesh with the worm gear 63 its shaft and pinion connections will operate the sleeve 85 and move the latter and the saddle with respect to the rod, base of machine and work table.

Having thus described my invention what I claim and desire to secure by Letters Patent is:

1. In a lathe of the class described, the combination with a base and upright having vertical front and side ways, a rotary work table, a front turret head mounted above the table, a saddle including a front portion and a side portion engaging the ways, a slide mounted in the saddle and carrying a tool head adapted to be moved to and from the axis of the table, a vertically disposed threaded rod secured to the base, a rotatable sleeve carried by the saddle and engaging the threaded rod, power means for operating the sleeve upon the rod, to raise and lower the saddle and tool slide, and power means for feeding the tool slide longitudinally in the saddle and with respect to the axis of the table.

2. In a lathe of the class described, the combination with a base and upright having vertical front and side ways, a rotary work table, a front turret head mounted above the table, a saddle including a front portion and a side portion engaging the ways, a slide mounted in the saddle and carrying a tool head adapted to be moved to and from the axis of the table, a fixed threaded rod extending through the saddle, a rotatable member carried by the saddle and engaging the threaded rod, means for operating the rotatable member, for raising and lowering the saddle and tool slide, a worm and gear for operating the tool slide, and power means for operating both the saddle and slide.

3. In a lathe of the class described, the combination with a base and upright having vertical front and side ways, a rotary work table, a front turret head mounted above the table, a saddle including a front portion and a side portion engaging the ways, a slide mounted in the saddle and carrying a tool head adapted to be moved to and from the axis of the table, a vertically disposed threaded rod secured to the base, a rotatable sleeve carried by the saddle and engaging the threaded rod, and power means for selectively operating either the sleeve and saddle or the tool slide with respect to the front turret head and table.

4. In a lathe, the combination with a base and upright having vertical front and side ways, a rotatable work table, a front turret head mounted above the table, an L-shaped side head saddle mounted on the corner portion of the upright and including a rearwardly extended side portion for engaging the side way, a horizontally movable slide mounted in the saddle and bearing a rack, a shaft and gear for operating the slide, a fixed threaded rod, and operatable member carried by the saddle and engaging the threaded rod, means for operating said operatable member for raising and lowering the saddle and tool slide, and power means for selectively operating with the sleeve and saddle or the tool slide with respect to the front turret head and table.

5. In a lathe, the combination with a base and upright having vertical front and side ways, a rotatable work table, a front turret head mounted above the table, an L shaped side head saddle mounted on the corner portion of the upright and including a rearwardly extended side portion for engaging the side way, a horizontally movable slide mounted in the saddle and bearing a rack, a shaft and gear for operating the slide, a fixed threaded rod, a rotatable member engaging the threaded rod, a power shaft, a gear transmission carried by the saddle and connected with the power shaft, and means intermediate the gear transmission and slide and saddle for selectively operating either the saddle or slide.

6. In a lathe of the class described, the combination with a base and upright having vertical front and side ways, a rotary work table, a saddle including a front portion and a side portion engaging the ways, a slide mounted in the saddle and carrying a tool head adapted to be moved to and from the axis of the table, means for raising and lowering the saddle, means for reciprocating the tool slide in the saddle and power means for selectively operating the saddle, operating means or the means for reciprocating the slide with respect to the table.

7. In a lathe of the class described, the combination with a base and upright having vertical front and side ways, a rotary work table, a saddle including a front portion and a side portion engaging the ways, a slide mounted in the saddle and carrying a tool head adapted to be moved to and from the axis of the table, a vertical feed shaft extending through the saddle, a horizontal feed shaft carried by the saddle for operating the slide, means for driving the vertical shaft, means for operating the horizontal shaft, worm and gear drives for selectively operating either of said driving means.

Signed at Bridgeport, in the county of Fairfield and State of Connecticut, this 25th day of August, A. D. 1927.

EDWARD P. BULLARD, Jr.